Sept. 18, 1956  S. S. POKORNY  2,763,349
POSITION HOLDER FOR VEHICLE ENGINE SPEED CONTROLS
Filed Dec. 22, 1952
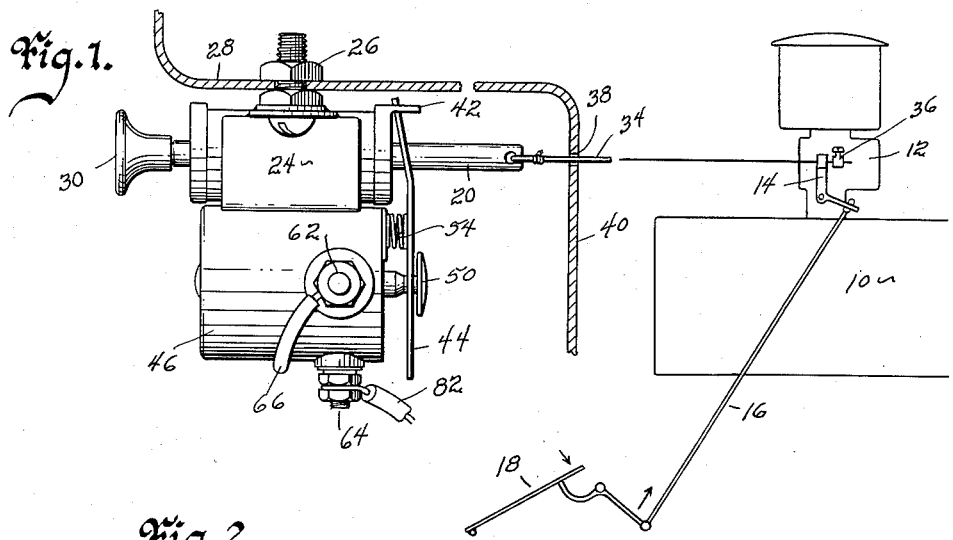
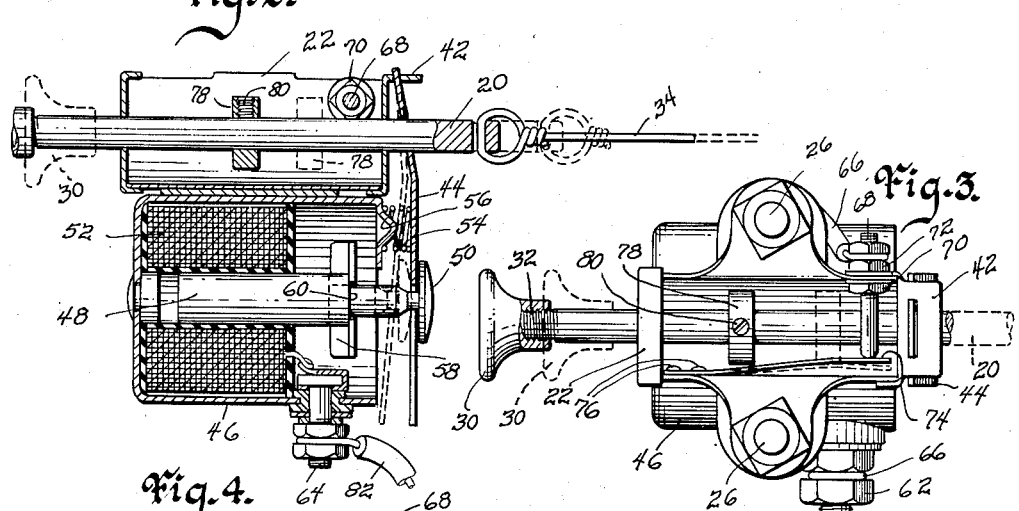
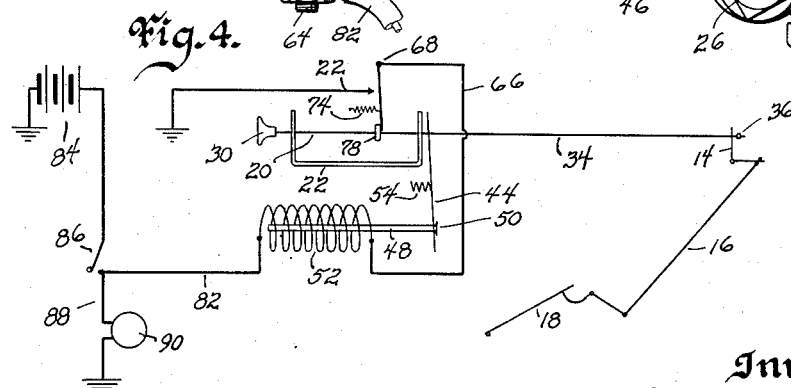
Inventor
Stephen S. Pokorny
by Talbert Dick & Adler
Attorneys
Witness
Edward P. Seeley

United States Patent Office 2,763,349
Patented Sept. 18, 1956

2,763,349

POSITION HOLDER FOR VEHICLE ENGINE SPEED CONTROLS

Stephen S. Pokorny, Maquoketa, Iowa

Application December 22, 1952, Serial No. 327,282

7 Claims. (Cl. 192—3)

My invention relates to variable speed engines for vehicles. Particularly my invention relates to those in which a lever is moved and held to increase and maintain the increased speed of the engine, and a spring returns the lever to an idling speed position whenever the lever is released. My invention is a novel device for securing the engine speed control in an advanced position and automatically releases the speed control to permit its return when the brakes of the vehicle are applied to slow the vehicle.

Many spring loaded vehicle speed control levers, hereafter referred to as a throttle although it could be a fuel as well as an air control, have been provided with means for holding them in advanced positions and automatically releasing them when the vehicle brakes are applied. These prior art devices, at least those known to me, all have a common drawback. In each and every case with which I am familiar, the device is of such a nature that it presents a considerable problem as far as installation is concerned. Some of these devices have electrically operated units that must be mounted on or near the carburetor. Such units require special brackets in order to adapt them to the various carburetor installations encountered. These units also frequently require special installations of switches and the like on various of the other controls.

Still other units operate mechanically and may, therefore, dispense with the switches. The installation of these mechanical units is even harder than the electrical units, however, because the various portions of the device must be operated by direct contact between the mechanisms and the units on which they operate or by which the mechanism is activated. This close connection between these various elements means that these mechanical units are rather inflexible. They are difficult to install even on a vehicle for which they are specifically designed and impossible to use generally without adapter kits being provided. Also, of course, these mechanical units frequently require rather delicate adjustments to insure positive action. Since this device affects the operation of the engine, positive action is essential.

In view of the foregoing, therefore, it is the principal object of my invention to provide a position holder for vehicle engine speed controls that has great flexibility.

It is a further object of my invention to provide a position holder for vehicle engine speed controls that is very easily installed.

It is a further object of my invention to provide a position holder for vehicle engine speed controls that combines mechanical and electrical features in its operation.

It is a further object of my invention to provide a position holder for vehicle engine speed controls that provides an auxiliary manual means for releasing the device.

It is a further object of my invention to provide a position holder for vehicle engine speed controls that is economical to manufacture, durable in use, and refined in appearance.

These and other objects will be apparent to those skilled in the art.

My invention consists in the construction, arrangement, and combination of the various parts of the device, whereby the objects contemplated are attained as hereinafter more fully set forth, and specifically pointed out in my claims, and illustrated in the accompanying drawings, in which:

Fig. 1 is a side elevation view of my position holder for vehicle engine speed controls shown mounted below the dashboard or instrument panel of a vehicle and with a diagrammatic representation of its connection to an engine speed control shown in conjunction therewith but at a smaller scale. Portions of the device are deleted to conserve space, Fig. 2 is an enlarged longitudinal sectional view of my position holder for vehicle engine speed controls with broken lines illustrating adjusted positions of the device, Fig. 3 is a plan view of my position holder for vehicle engine speed controls shown at the same scale as that used in Fig. 2 and with broken lines illustrating an adjusted position, and Fig. 4 is an electrical wiring diagram and schematic representation of the mechanical operation of my position holder for vehicle engine speed controls.

Referring to the drawings I have used the numeral 10 to designate a vehicle engine provided with the usual carburetor 12. A throttle control lever designated 14 is connected by appropriate linkage 16 to the accelerator pedal 18. As here shown a downward movement of the accelerator pedal produces a rearward motion of the upper portion of the throttle lever 14. By moving the upper portion of the throttle 14 in a rearward direction, therefore, increased speed of the engine is accomplished. The particular arrangement here described is merely illustrative and may vary from installation to installation. In all cases, however, a rearwardly moving portion of the throttle lever exists or may be readily supplied regardless of the specific action of the accelerator pedal on the throttle valve.

My invention consists of a means for holding the upper portion of the throttle lever 14 in a rearward position at a point determined empirically from the speed at which it is desired that the vehicle operate. This is accomplished by means of a rod designated 20 which is slidably mounted in the case 22. The case 22 is rigidly secured to the solenoid mounting bracket 24 and both of them also rigidly secured in the passenger compartment of the vehicle by any suitable means, such as, the simple expedient shown in Fig. 1 of extending the nut and bolt assembly 26 through appropriately drilled holes in the bottom side of the dashboard 28. It is important that this connection be a solid one not only to insure that the device is restrained against physical movement, but, also, to provide a ground connection for the electric circuit which will be described hereafter. The rod 20 may be provided with any suitable means to facilitate drawing it to the left, as viewed in all of the figures, such as, the knob 30 which is secured to the rod in any appropriate manner as by the threads 32. A suitable connection between the rod 20 and carburetor lever 14 is provided by means of a stiff wire or like designated 34. This wire passes loosely through an opening in the lever 14 so as to avoid restraining movement of the carburetor lever by means of the accelerator pedal as far as increasing engine speed is concerned. An appropriate stop means such as the collar 36 is set screwed to the end of the wire 34 to prevent it from moving through the lever 14 in a rearwardly direction beyond a predetermined point. Thus if the rod 20 is drawn to the left as shown in Fig. 3, it will move the wire 34 in a similar manner and cause movement of the carburetor lever 14 in a manner that will increase engine speed. An appropriate hole, such as the one designated 38, must be provided in the vehicle fire wall 40 to permit free passage of the wire 34 through it. The case 22 is provided at its upper front with a pierced ear 42 in which the end of clamping lever 44 is pivotally engaged. The clamping lever embraces the rod 22 and frictionally rests movement in a right hand direction as shown in Fig. 2 whenever the lever is in the position shown in that figure by solid lines. Lever 44 extends down past the solenoid case 46 and embraces the solenoid sliding core 48. The solenoid core 48 is provided with a head 50 which engages the outer or right hand side of the lever 44, and, therefore, moves the lever 44 as shown by the broken lines in Fig. 2 whenever the core is attracted into the coil by energizing it. The coil is designated 52. A suitable resilient means such as the spring 54 yieldingly urges the lever 44 toward the position shown by the solid lines in Figs. 1 and 2. The box 56 formed on the solenoid case 46 provides a suitable means for retaining the spring in its operable position. A stop block 58 engages the shoulder 60 on the core 48 to prevent it from accidental disengagement from the balance of the solenoid assembly. The solenoid coil is provided with two terminals designated 62 and 64 respectively. One of these coil terminals is connected by a lead 66 to the ground switch designated 68 which is mounted in the case 22. The ground switch terminal 68 is secured to the case by a pair of nuts designated 70 and 72 respectively, which clamp the terminal in the case by appropriate adjustment of these nuts longitudinal movement of the terminal toward or away from the ground spring 74 may be accomplished. The ground spring is riveted or otherwise secured to the case in a manner which causes it to conduct electricity to the case. Appropriate rivets 76 are shown in Fig. 3. Secured to the shaft 20 is a ground switch operating collar 78. A suitable means for securing this collar against slippage on the shaft should be provided and an appropriate one is provided by the set screw 80. The terminal 64 is connected by a lead designated 82 to a cold side of the brake stop light system of the vehicle which is illustrated on the wiring diagram. Referring to the wiring diagram, the numeral 84 designates an appropriate source of electrical energy such as the battery or the like which is appropriately connected to the hydraulically operated brake light switch 86. A lead 88 connects the switch to the brake stop light 90, therefore, by applying pressure on the brake pedal of the vehicle and causing the pressure switch 86, which is a switch of the usual type, to close, a complete circuit for electricity is provided through the brake stop light and also through the solenoid coil 52 under certain conditions which will now be explained.

The operation of my device is easily understood and may be accomplished by any individual of reasonable intelligence with little or no instruction. First of all, it is obvious that the vehicle will operate in the usual manner if the device is not used at all. When it is desired to use the device, however, the appropriate throttle setting is achieved by either pulling manually on knob 30 or by a combination of depressing the foot pedal 18 and pulling on the knob 30 until the vehicle obtains the desired speed. Then both the foot pedal and the knob are released. Spring 54 exerts an outward pressure on the clamping lever 44 which binds on the shaft 20 to prevent it from moving inward or to the right as shown in all figures. The throttle lever 14, is, therefore, held in an advanced throttle position and the speed of the engine, and, therefore, the vehicle is then maintained. In the event that greater speed of the vehicle is desired momentarily as when passing or in some moment of emergency the accelerator pedal 18 may be depressed without restraint. When the accelerator pedal is released, however, the lever 14 which is equipped with any suitable return spring (not shown) will return to the position previously determined by the manual adjustment of rod 20. In the event that it is necessary to reduce the speed of the vehicle either of two possible courses may be taken. The operator may apply the brakes on the vehicle which will close switch 86. Power from the source 84 will be applied to coil 52, therefore, and through the lead 66 to the ground switch 68. With rod 20 in an extended position the collar 80 is withdrawn from contact with ground spring 74. This spring, therefore, contacts the ground terminal 68 thereby completing the path for current through the case 22, the nut and bolt assembly, and the frame of the vehicle back to the opposite side of the power source. As soon as the coil is energized, the core 48 is attracted into the coil in the conventional manner thereby depressing lever 44. As soon as the lever 44 is moved to the position shown by broken lines in Fig. 2, the rod 20 is free to move to the right to a position shown by the broken lines in that figure. Since the rod is free to move, the return spring on the throttle lever 14 moves both it and the rod 20 because they are connected by wire 34. As the rod approaches its released position, the collar 80 begins to engage the spring 74 and when it has finally reached its retracted position depresses the spring 74 to such an extent that the ground connection for the solenoid coil is interrupted. Therefore, the solenoid coil operates only momentarily even though the brake pedal may be depressed for a considerable period. Since the stop light switch is more sensitive than the brakes themselves to the two pressures developed by the master cylinder by actuating it, the throttle holding mechanism is released before any appreciable braking occurs. If, for any reason, it is desired to avoid any application of the brakes and at the same time release the throttle holding mechanism, a second method of operation may be used. Since my unit is mounted directly below the instrument panel within easy reach of the operator of the vehicle, it is a simple matter for the operator to reach past the solenoid case 46 and to depress the lever 44 by manual movement of it. This action releases the throttle lever holding device as surely as does the operation of the solenoid.

The major advantage which flows from the use of my device is the easy installation which is a result of the flexibility of the device. It will be noted that substantially all of the mechanism is mounted in the driver's compartment and that only two connections need be made exclusive of the mounting of the unit on the instrument panel. The wire 34 must be properly connected and the lead wire 82 must be connected to the brake light switch or at least into the brake light circuit. In some cases the electrical connection may be made at a junction panel mounted behind the instrument panel. The device may be physically mounted inside the driving compartment to align with the carburetor thereby avoiding the necessity for any special linkage. In the event, however, that the carburetor is mounted on a side of the engine opposite to that on which the operator sits, a simple linkage of transferring the pull of wire 34 to the opposite side of the engine block may be constructed in a manner that will accommodate substantially all of the possible installations. It is obvious, therefore, that by reason of the use of a mechanical means for holding the throttle and the use of an electrical means solely for the purpose of releasing the throttle holding mechanism, that a very compact unit may be provided which requires no special adapters applicable to only one make or model of vehicle. Furthermore, the emergency manual release technique of my device makes it exceedingly safe even if the electrical circuit should fail. Failure of the electrical circuit is unlikely, however, since it is a relatively simple one and well protected by the case 22 with respect to its few moving parts. Furthermore, since the solenoid coil is used very little, it should have a considerable service life. In the claims the solenoid case 46 and its bracket 24 together with case 22 may be referred to at times as the frame of the unit and when this term is used it applies collectively to all of these three mentioned individually described elements or to any one or more of them depending on the context of the claim.

Some changes may be made in the construction and arrangement of my position holder for vehicle engine speed controls without departing from the real spirit and purpose of my invention, and it is my intention to cover by my claims, any modified forms of structure or use of mechanical equivalents which may be reasonably included within their scope.

I claim:

1. In a position holding device, a frame, means secured to said frame for securing it physically and electrically to the instrument panel of a vehicle, a rod slidably mounted in said frame, a lever having a hole therein pivotally secured to said frame; said rod extending through and being smaller than said hole in said lever, a resilient means bearing on said frame and said lever yieldingly pivotally moving said lever to assume a binding position relative to said rod, a means for attaching said rod to a control mechanism, a solenoid coil mounted in said frame, a core slidably mounted in the center of said solenoid coil, a means secured to said core for securing it to said lever, a lead wire connected to one end of said solenoid coil and adapted to having its other end connected to the one side of a switch, and a means connected to the other end of said solenoid coil and to said frame.

2. In a position holding device, a frame, means secured to said frame for securing it physically and electrically to the instrument panel of a vehicle, a rod slidably mounted in said frame, a lever having a hole therein pivotally secured to said frame; said rod extending through and being smaller than said hole in said lever, a resilient means bearing on said frame and said lever yieldingly forcing said lever to assume a binding position relative to said rod, a means for attaching said rod to a control mechanism, a solenoid coil mounted in said frame, a core slidably mounted in the center of said solenoid coil, a means for attaching said core to said lever, a lead wire connected to one end of the said solenoid coil and adapted to having its other end operatively connected to the negative side of a switch, a terminal post connected to said frame at one point and extending toward and terminating short of another point on said frame, a lead wire connecting said terminal post to the other end of said solenoid coil, a spring secured to said frame and yielding engaging said terminal post, and a means secured to said rod for engaging and moving said spring secured to said case away from said terminal post when said rod is slidably moved in said frame in one direction.

3. In a position holding device, a frame, a rod slidably mounted in said frame, a solenoid coil secured to said frame near said rod, a headed sliding core in said solenoid coil, a clamping lever having a hole therein pivotally secured to said frame and embracing said rod; said clamping lever also engaging the head of said headed sliding core, a resilient element secured to said frame and yieldingly urging said clamping lever away from said solenoid coil; said clamping lever resisting movement of said rod in one direction when urged by said spring, a lead wire connected to said solenoid coil and adapted to be electrically connected to a switch, a terminal post secured to said frame and extending near said rod, a spring secured to said frame and extending parallel to said rod; said spring yieldingly contacting said terminal post, a wire connected to the other end of said solenoid coil and said terminal post, a collar secured to said rod and engaging said spring when said rod is in one position to force said spring away from said terminal post, means secured to the rod adapted to being secured to a control mechanism, and means secured to said frame for securing it electrically and physically to the instrument panel of a vehicle.

4. In a position holding device, a frame, means secured to said frame for securing it physically and electrically to the instrument panel of a vehicle, a rod slidably mounted in said frame, a lever having a hole therein pivotally secured to said frame; said rod extending through and being smaller than said hole in said lever, a resilient means bearing on said frame and said lever yieldingly forcing said lever to assume a binding position relative to said rod, a means on said rod for attaching it to a control mechanism, a solenoid coil mounted in said frame, a core slidably mounted in the center of said solenoid coil, a means for connecting said core to said lever, a lead wire connected to one end of said solenoid coil and adapted to have its other end connected to the ground side of a switch, a spring loaded closed ground switch mounted on said frame and electrically connected to the other end of said solenoid coil, and means on said rod for opening said spring load closed ground switch at times.

5. A speed position holder, comprising, a frame adapted to be attached to the instrument panel of a vehicle, a rod slidably mounted in said frame, a clamping lever having a hole embracing said rod; said hole being of greater diameter than the diameter of said rod, a spring means yieldingly urging said lever in one direction of its movement, a solenoid coil adapted to be electrically connected to a switch, a core slidably mounted in said solenoid coil and operatively attached to said lever whereby when the said switch is closed, said solenoid coil will be energized, said core will be moved, thereby causing said lever to move against the action of said spring means and assume a non-clamping engagement with said rod.

6. A speed position holder, comprising, a frame adapted to be attached to the instrument panel of a vehicle, a rod slidably mounted in said frame, a clamping lever hingedly secured at one end to said frame and having a hole embracing said rod; said hole being of greater diameter than the diameter of said rod, a spring means yieldingly urging said lever in one direction of its movement, a solenoid coil adapted to be electrically connected to a switch, a core slidably mounted in said solenoid coil and operatively attached to said lever whereby when the said switch is closed, said solenoid coil will be energized, said core will be moved, thereby causing said lever to move against the action of said spring means and assume a non-clamping engagement with said rod.

7. A speed position holder, comprising, a frame adapted to be attached to the instrument panel of a vehicle, a rod slidably mounted in said frame, a clamping lever having a hole embracing said rod; said hole being of greater diameter than the diameter of said rod, a spring means yieldingly urging said lever in one direction of its movement, a solenoid coil adapted to be electrically connected to a switch, a core slidably mounted in said solenoid coil; loosely extending through said lever, a head on said core engaging one side of said lever, and a shoulder on said core for engaging the other side of said lever; whereby when the said switch is closed, said solenoid coil will be energized, said core will be moved, thereby causing said lever to move against the action of said spring means and assume a non-clamping engagement with said rod.

References Cited in the file of this patent

UNITED STATES PATENTS

| | | |
|---|---|---|
| 1,165,903 | Reed | Dec. 28, 1915 |
| 1,671,658 | Travers | May 29, 1928 |
| 2,159,076 | Douglas | May 23, 1939 |
| 2,318,931 | Deier | May 11, 1943 |
| 2,443,697 | Smith | June 22, 1948 |
| 2,509,358 | Krieg | May 30, 1950 |
| 2,528,745 | Fisher | Nov. 7, 1950 |
| 2,599,079 | Tatom | June 3, 1952 |
| 2,624,433 | Godbout | June 6, 1953 |
| 2,673,624 | Huber | Mar. 30, 1954 |